United States Patent [19]

Morris

[11] 4,416,460
[45] Nov. 22, 1983

[54] DRIVE MECHANISMS

[76] Inventor: Lionel G. Morris, 17 Ferguson Ave., Myrtle Bank, State of South Australia, Australia

[21] Appl. No.: 250,249

[22] Filed: Apr. 2, 1981

[51] Int. Cl.³ .............................................. B60K 9/00
[52] U.S. Cl. ..................................... 280/3; 180/19 H; 188/69
[58] Field of Search ............... 280/3; 188/31, 69, 129; 180/19 H

[56] References Cited

U.S. PATENT DOCUMENTS 2,645,297  7/1953  Wennberg et al. ................ 180/19.3
3,680,890  8/1972  Magown et al. .................... 280/474
4,227,706 10/1982  Morris .................................... 280/3

Primary Examiner—John A. Pekar
Assistant Examiner—D. Lynn Fugate
Attorney, Agent, or Firm—Oldham, Oldham, Hudak, Weber & Sand Co.

[57] ABSTRACT

A traction jockey wheel having a drive mechanism of a pawl and ratchet wheel type with a braking interlock operable when a lever arm used for drive and steering of the traction wheels is lowered or raised past a select range of operating positions. The improvement can apply to either a single wheel or a dual wheel traction wheel assembly.

4 Claims, 5 Drawing Figures

DRIVE MECHANISMS

This invention relates to traction jockey wheels of a type useful for supporting and assisting movement of towed vehicles such as caravans or trailers.

I have developed wheels of this type some aspects of which have been subject of previous patent applications and granted patents such as U.S. Pat. No. 4,227,706 include a pawl and ratchet wheel in which the ratchet wheel is co-axially secured to a ground engageable wheel and preferably there is an adjustably positioned pawl secured to a supporting frame and a second adjustably positioned pawl secured to an operating lever arm which in itself is pivotally secured about an axis co-axial with the ratchet wheel.

Both of the pawls are adjustably positioned so that in one position, movement of the operating lever arm can effect drive of the ratchet wheel in a first direction about its axial support and thereby cause the traction wheel to rotate and hence any supported towed vehicle and by otherwise positioning each of the pawls, movement of the operating lever arm can be made to effect rotation of the ratchet wheel and hence the traction wheel in an opposite direction.

Such a drive mechanism can be duplicated so that there can be two ground engageable traction wheels and by having these separately rotatable and separate pawls for each of the ratchet wheels, a differential effect providing for ease in steerability can be achieved.

This differential effect can be achieved with drive on each wheel so that there is advantage in a two wheel arrangement although the drive mechanism is not directed exclusively either to a single wheel or to a dual wheel system.

The problem to which this invention is directed relates to a difficulty that can be experienced when using either of the above mechanisms.

If in any instance, the towed vehicle commences to move under its own impetus in the direction that is otherwise selected for the pawls then there is no inhibition by reason of the drive mechanism to movement in this direction.

This can perhaps be better understood by appreciating the problem that can occur with a large caravan which is pulled by using the traction jockey wheel mechanism to the peak of a hill but as the hill is reached, commences under its own weight to move down the hill.

In this circumstance, neither of the ratchet settings of the pawls would inhibit this movement and a dangerous situation could arise if the person operating the traction jockey wheel should happen to fall then there is a real possibility that the vehicle could proceed without his guidance and he in fact could be in danger of being hit or even run over by the vehicle.

According to this invention this problem is overcome by providing that with the drive mechanism there is provided a brake means, and a brake control arrangement arranged so that in a first selected range of positions of the lever arm, the brake means are held in a non-braking position, and in its second range of positions of the lever arm the brake means are released so they may assume a braking position with respect to the traction wheel or wheels.

It is a characteristic of this arrangement that the operating lever arm is used both to effect a drive of the traction wheel and is also used for steering.

The operating range of positions of the lever arm relates therefore to the range of positions of the lever arm with respect to the support frame of the traction jockey wheel so that the steering control position of the lever arm is then not relevant.

This could however include rotation of the lever arm about its elongate axis against a spring return pressure or it could include in a preferred instance enabling a braking means to assume an effective braking position when the lever arm is in an uppermost relative position to the support frame or in a lowermost position.

It will be understood that the more important of these positions is the lowermost position in that if a person should happen to fall then the lever arm is allowed to fall also and upon this reaching a lowermost position that is typically with the lever arm engaging the ground then clearly this will allow the brake to engage and impede an otherwise dangerous situation developing.

There is value in having the lever arm uppermost with a braking effect in that this can be an assured storage position in which the lever arm is in effectively a storage position and the traction wheels are then effectively in a locked condition.

This concept can apply in either of the cases where either there is a single traction wheel or there are two traction wheels co-axially supported.

Indeed there is no limit to the number of wheels that can be co-axially supported although two has been found to be a preferred number.

With the two traction wheels, in a preferred instance, there can either be a separate mechanism for each wheel including a separate braking means independently operating or there can be a commonly applied braking member as will be illustrated in the preferred embodiment.

For a better understanding of this invention it will now be described with the assistance of drawings in which.

Figure 1:
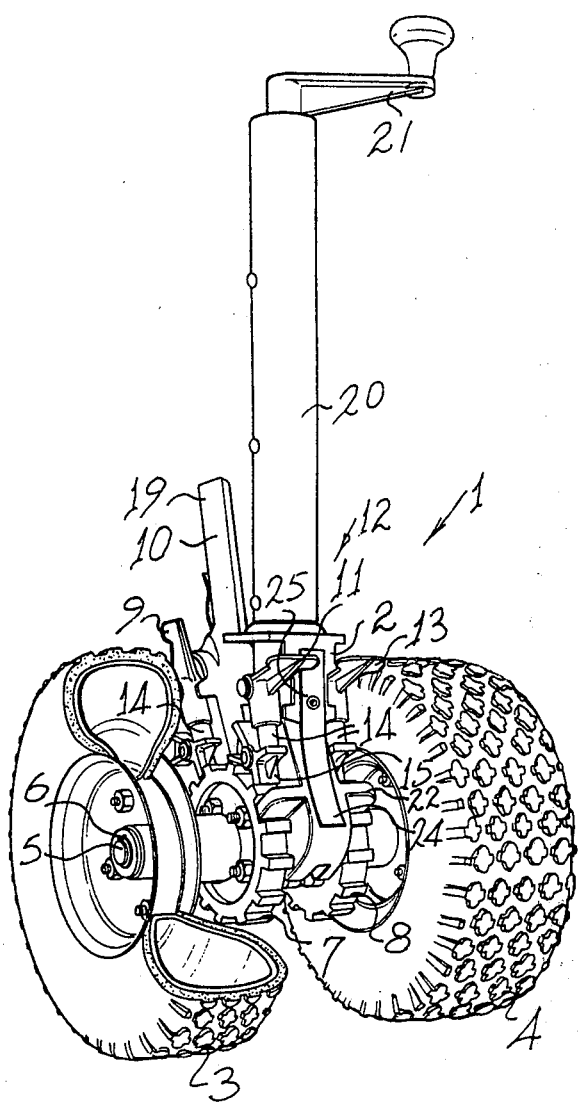
FIG. 1 is a perspective view of a traction jockey wheel according to a first preferred embodiment having a part of one of the traction wheels cutaway for clearer visibility.
Figure 2:
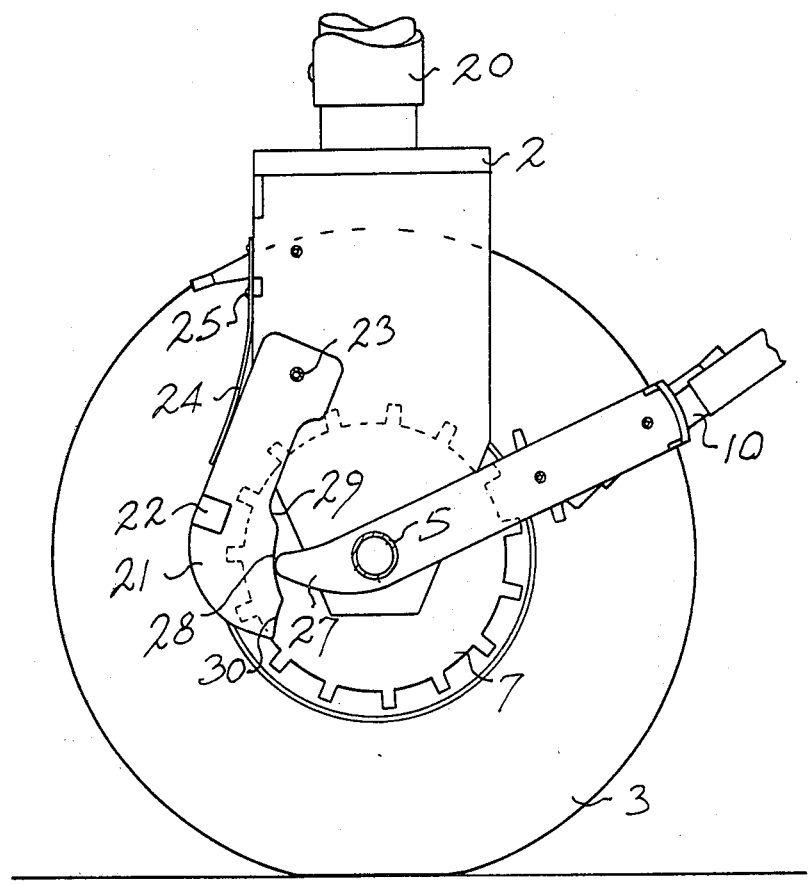
FIG. 2 is a side elevation of the traction jockey wheel as in FIG. 1 according to the first embodiments viewed however from an alignment 2—2 as shown in FIG. 1.
Figure 3:
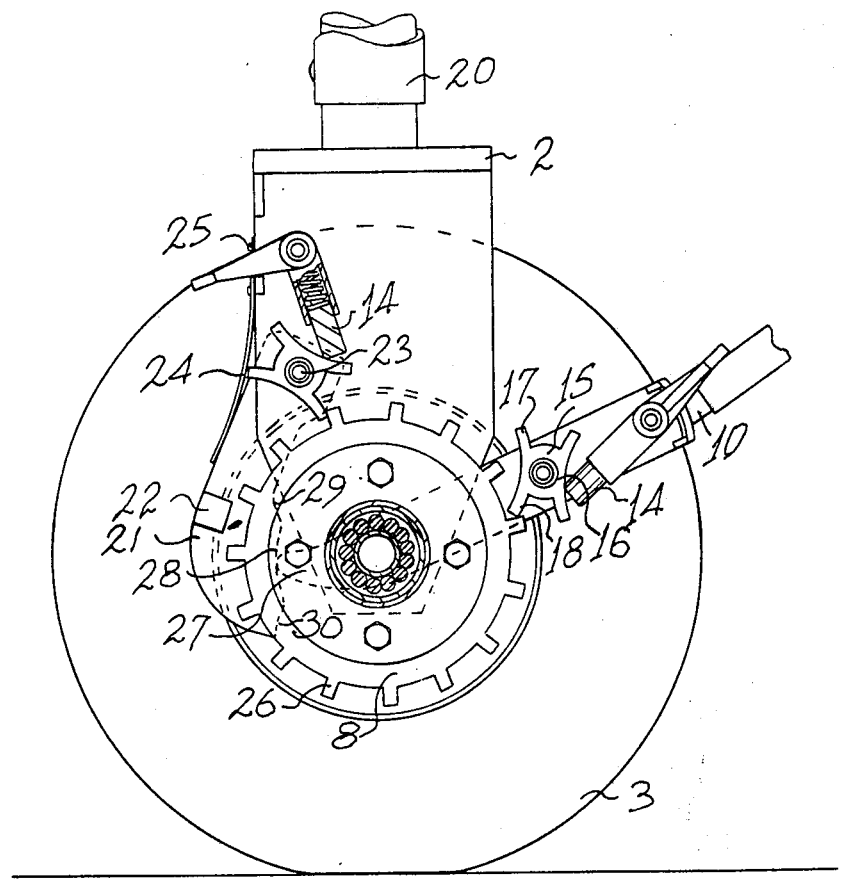
Figure 4:
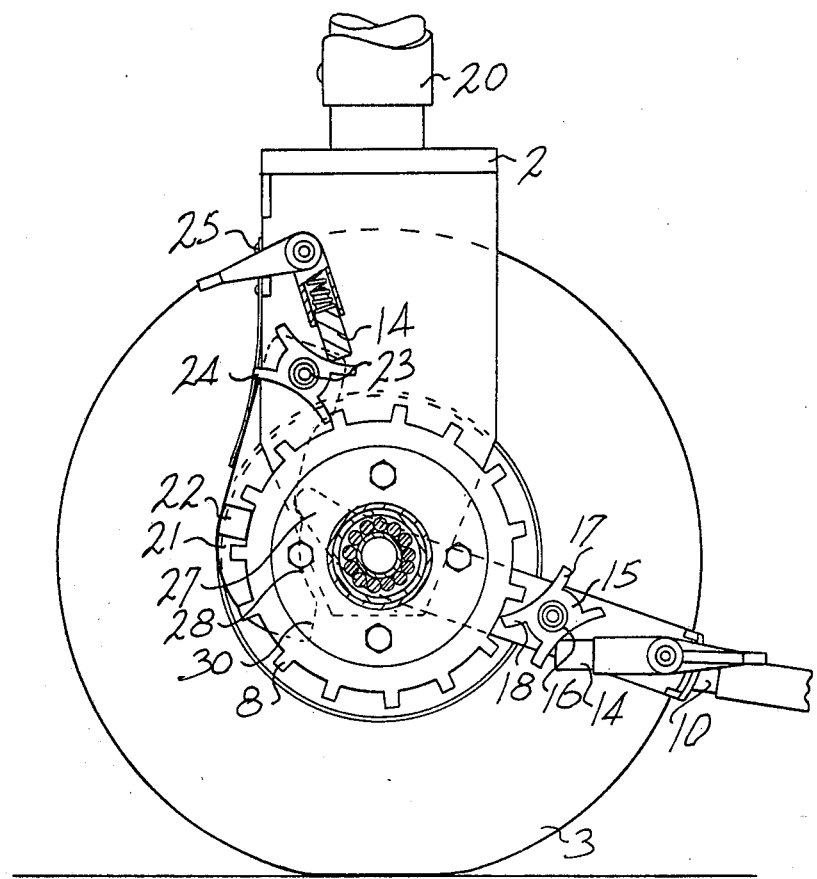
Figure 5:
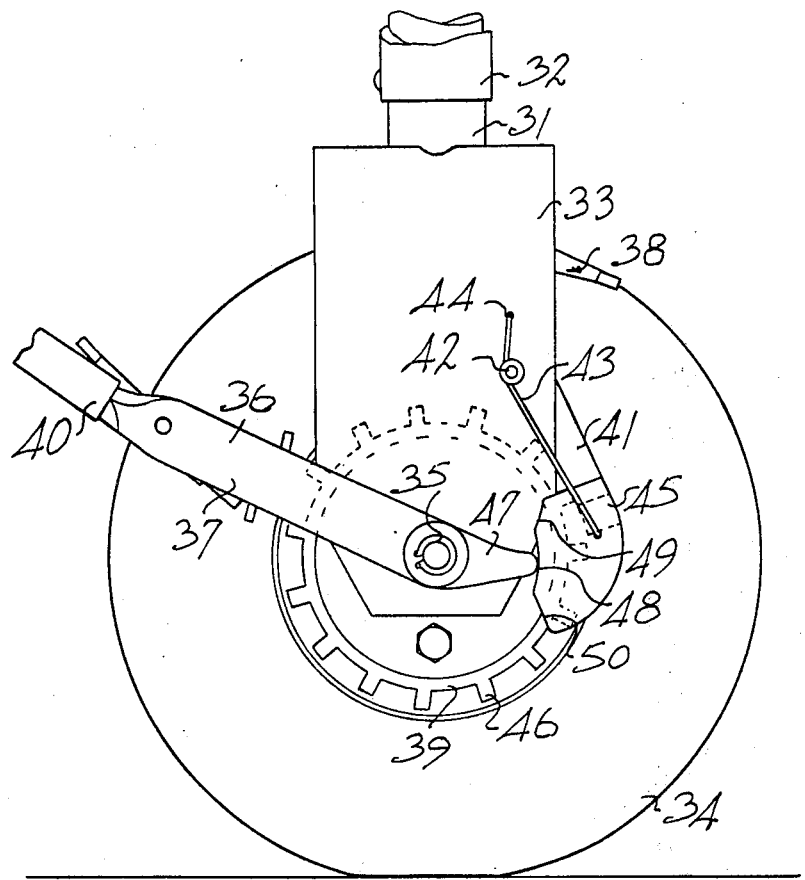

FIG. 3 is a side elevation once again in cross-section and from an alignment 3—3 of the first embodiment as shown in FIG. 1 showing the operating lever arm in a position whereby the braking means are in a non-braking position, FIG. 4 is a view identical with that as shown in FIG. 3 of the first embodiment except that the lever arm is shown in a position in which the braking means are in a braking position and finally, FIG. 5 is a side elevation of a second embodiment providing the mechanism and lever arm assembly for a single traction jockey wheel.

Referring now in detail to the drawings and referring firstly to the first preferred embodiment as illustrated in FIGS. 1 through to 4 this includes a traction jockey wheel 1 which includes a support frame 2 and supported from this two traction wheels which are independently rotatable 3 and 4 each on a common axial 5 and each held in position by a spring washer 6.

Secured co-axially with respect to each of the traction wheels 3 and 4 is a ratchet wheel 7 and 8 so arranged that each of the ratchet wheels are co-axial with the respective traction wheel and secured so as to rotate co-axially therewith.

With respect to each of the ratchet wheels 7 and 8 are spring loaded pawls which are adjustably supported in the case of pawl 9 by a lever arm assembly 10 and in the case of pawl 11 by the support frame 2. Likewise in the case of pawl 12 which is not shown this also being supported by lever arm assembly 10 and in the case of pawl 13 this is adjustably supported by support frame 2 both of these in respect of ratchet wheel 8.

Each of the pawls is pivotally supported with respect to the respective mounts and includes a spring loaded plunger 14 which acts against member 15 which includes at an upper edge a concave face 16 and at a lower edge fingers 17 and 18 the member 15 being pivotally supported with respect to the respective support member.

It will be seen by the use of this arrangement that by co-operatively adjusting each of the pawls in position, so that each will provide a ratchet freedom in one direction and a lock against movement of the ratchet wheel in the other then this will ensure forward or reverse movement depending upon the adjustable position selected when the lever arm assembly 10 is moved relative to the support frame 2.

It is to be noted that in FIG. 1 the lever arm assembly includes a spigot 19 to which an extension comprising a hollow lever member can be secured to provide substantial leverage and steering control when necessary.

The support frame 2 further includes an extendible stem 20 and a control handle 21 controlling the degree of extension of the stem 20.

To provide a braking effect when necessary there is provided a braking member 21 which includes a tooth 22 and which is pivotally supported with respect to the support frame 2 about an axis at 23 which coincides with the axis of the member 15 where this secured to the support frame 2.

A spring member 24 is secured to the support frame 2 at 25 and is so arranged so as to bias the movement of the brake member 21 so that it will be urged into a braking position that is with the tooth 22 interlocking with respect to the teeth 26 of the ratchet wheel 8.

This of course is repeated in the same manner with ratchet wheel 7.

The interlocking position of the braking member 21 is however controlled by the effective interrelationship of the leg 27 which is secured at an end of the lever arm arrangement 10 and this engages against a cam or cam base 28 which is so shaped that when it is in the position as shown in FIG. 3 this will hold the tooth 22 from a locking action and therefor in a non-braking position but when it is moved up into the position either at 29 or 30 then this will allow for the tooth 22 to move to a locking position and hence a braking position with respect to the traction wheel 4. The braking member 21 is controlled by a cam and actuator arrangement between the cam 28 and the actuator or leg 27.

This position is most clearly shown in FIG. 4 in which the lever arm assembly 10 is shown in a lowermost position whereupon allowing tooth 22 under the influence of spring 24 to assume an interlocking position with respect to the teeth 26 of the ratchet wheel 8.

It will be seen from this that there are a range of positions over an operating range that the lever arm assembly 10 can work through but this can then be shifted to a lowermost position which will normally not be used when normally effecting a drive of the traction wheels or in an uppermost position as shown in FIG. 1 which is generally a storage position which is also a position not normally assumed when the wheels are being driven.

Now referring to the second embodiment as shown in FIG. 5, this relates to the mechanism which is used in conjunction with a single traction wheel.

Accordingly the support frame 31 includes an extendible stem 32 only part of which is shown for sake of simplicity and a yoke 33 which extends with legs to support the frame 31 on both sides of the traction wheel 34 by engaging support axial 35.

A lever arm assembly 36 with appropriately adjustable pawls 37 and 38 which are not fully shown but which operate and are arranged in identical fashion to that shown in the first embodiment operatively interconnect in the same way as in the first embodiment with the ratchet wheel 39 so that in one position operation of the lever arm assembly 36 with the lever arm extension in this case 40 will effect drive in one direction with the pawl 38 supported by the support frame 31 by reason of its pivot support on a portion of the leg of the yoke 33.

The addition in this case includes a brake member 41 which is pivotally supported about the axial support 42 which is secured relative to the yoke 33 which is a part of the support frame 31 and this drive member 41 is urged into a braking position by reason of spring element 43 which has an end secured by passing through an aperture at 44.

The brake member 41 has a tooth 45 which is adapted to interlock with the teeth 46 of the ratchet wheel 39.

This is inhibited by reason of the leg 47 engaging against the cam face 48 of the drive member 41.

If however the leg 47 reaches portions 49 or 50 then of course this allows the position of the drive member 41 to swing in the direction of the spring pressure caused by 43 which causes an interlock of the ratchet wheel and hence the traction wheel 34 with respect to the support frame 31.

This then describes the preferred embodiment from which it will be seen that by incorporation of a braking means and control means relative to the braking member operable so that a braking effect is achieved when the lever arm is in an other than selected range of positions then this provides a very good safety factor and provides for significant improvement in relation to this concept.

The claims defining the invention are as follows, I claim:

1. A traction jockey wheel of a type useful for supporting and assisting movement of towed vehicles, and including with a supporting frame, a ground engaging traction wheel or wheels, an extendible stem to which the towed vehicle can be secured, and a drive mechanism to effect rotation of the traction wheel or wheels including a ratchet wheel coaxially secured to each of the traction wheels, and a pawl arranged with one said ratchet wheel so that a manually operable lever arm can be used to effect rotation for traction purposes of the traction wheels and can control steering of the traction wheels, the traction jockey wheel being characterized according to this invention in that the drive mechanism includes a brake means and a brake control arrangement including a cam and actuator adapted to interengage between the lever arm and the brake means and arranged so that in a first selected range of positions of the lever arm with respect to the supporting frame, the brake means are held in a non-braking position, and in a second range of positions of the lever arm with respect to the supporting frame, the brake means are released to assume a braking position with respect to the supporting frame, the brake means are held in a non-braking position, and in a second range of positions of the lever arm with respect to the supporting frame, the brake means are held in a non-braking position, and in a second range of positions of the lever arm with respect to the supporting frame, the brake means are released to assume a braking position with respect to the traction wheel or wheels, and a resiliently loaded pawl adjustably supported by the supporting frame and effective by engagement against said ratchet wheel or wheels secured either to the traction wheel or traction wheels, to impede motion of the ratchet wheel in either direction in respect of a traction rotation.

2. A traction jockey wheel comprising a support frame, a ground engageable traction wheel supported by the support frame for traction about a substantially horizontal axis and steering about a substantially vertical axis, a ratchet wheel co-axially secured to the traction wheel, a spring loaded pawl adjustably supported by a manually operable lever arm which is pivotally co-axially supported with respect to the traction wheel, and effective to cause a ratchet drive with respect to the ratchet wheel in either of a selected traction rotational direction, and a spring loaded pawl adjustably supported by the supporting frame and effective by engagement against the ratchet wheel to impede motion of the ratchet wheel in either of the selected rotational traction directions, braking means pivotally supported by the support frame and including an interlocking tooth, spring means arranged to urge the tooth into an interlocking braking position with respect to the ratchet wheel, and inter-engaging cam means between braking means and the lever arm arranged so as to hold the tooth from an interlocking braking position only when the lever arm is in a selected operating range of positions.

3. A traction jockey wheel according to claim 2 when secured to and supporting the draft frame of a towed vehicle.

4. A traction jockey wheel of a type useful for supporting and assisting movement of towed vehicles, and including with a supporting frame, a ground engaging traction wheel or wheels, an extendible stem to which the towed vehicle can be secured, and a drive mechanism to effect rotation of the traction wheel or wheels including a ratchet wheel coaxially secured to each of the traction wheels, and a pawl arranged with one said ratchet wheel so that a manually operable lever arm can by vertical pivotal action between upper and lower portions be used to effect rotation for traction purposes of the traction wheels and can control steering of the traction wheels, the traction jockey wheel being characterized according to this invention in that the drive mechanism includes a brake means and a brake control arrangement including a cam and actuator adapted to interengage between the lever arm and the brake means and arranged so that in a first selected range of positions of the lever arm with respect to the supporting frame, the brake means are held in a non-braking position, and in a second range of positions of the lever arm with respect to the supporting frame, the brake means are released to assume a braking position with respect to the traction wheel or wheels, and the brake means including an interlocking tooth pivotally supported with respect the supporting frame so that the braking position can be achieved by the said tooth interlocking with the teeth of a said ratchet wheel, said tooth and cam being an operative unit, and said actuator being a unit with said lever arm so that said actuator can directly engage said cam and control the brake means rendering them operative when the lever arm is in its lower position.

* * * * *

UNITED STATES PATENT OFFICE
CERTIFICATE OF CORRECTION

Patent No. 4,416,460　　　　　　　　　　Dated November 22, 1983

Inventor(s) Lionel Graham Morris

It is certified that error appears in the above-identified patent and that said Letters Patent are hereby corrected as shown below:

Column 4, line 65 - cancel from "the brake means . . . . to column 5, line 4, .. . . . the supporting frame,"

Signed and Sealed this

Twentieth Day of November 1984

[SEAL]

Attest:

Attesting Officer

GERALD J. MOSSINGHOFF

Commissioner of Patents and Trademarks